United States Patent
Osawa et al.

(10) Patent No.: US 11,123,811 B2
(45) Date of Patent: Sep. 21, 2021

(54) CUTTING TOOL, INSERT HOLDER AND INSERT

(71) Applicant: OSG CORPORATION, Toyokawa (JP)

(72) Inventors: Jiro Osawa, Toyokawa (JP); Tomonori Yoda, Toyokawa (JP)

(73) Assignee: OSG CORPORATION, Toyokawa (JP)

( * ) Notice: Subject to any disclaimer, the term of this patent is extended or adjusted under 35 U.S.C. 154(b) by 264 days.

(21) Appl. No.: 16/349,024

(22) PCT Filed: Dec. 6, 2016

(86) PCT No.: PCT/JP2016/086190
§ 371 (c)(1),
(2) Date: May 10, 2019

(87) PCT Pub. No.: WO2018/105035
PCT Pub. Date: Jun. 14, 2018

(65) Prior Publication Data
US 2019/0262914 A1    Aug. 29, 2019

(51) Int. Cl.
*B23C 5/10*    (2006.01)
*B23D 77/02*    (2006.01)
*B23F 21/16*    (2006.01)

(52) U.S. Cl.
CPC ............... *B23C 5/109* (2013.01); *B23C 5/10* (2013.01); *B23D 77/02* (2013.01); *B23F 21/16* (2013.01)

(58) Field of Classification Search
CPC .... B23D 77/02; B23D 77/025; B23D 77/042; B23D 77/044; B23D 2277/02;
(Continued)

(56) References Cited

U.S. PATENT DOCUMENTS 914,653 A * 3/1909 Gallagher ............... B23D 77/02
408/141
1,241,953 A * 10/1917 Frick ................. B23B 29/03478
408/150
(Continued)

FOREIGN PATENT DOCUMENTS

CN    2477707 Y    2/2002
CN    102026765 A    4/2011
(Continued)

OTHER PUBLICATIONS

International Search Report dated Feb. 21, 2017, issued in counterpart application No. PCT/JP2016/086190, w/English translation (5 pages).
(Continued)

*Primary Examiner* — Nicole N Ramos
(74) *Attorney, Agent, or Firm* — Westerman, Hattori, Daniels & Adrian, LLP

(57) ABSTRACT

Multiple grooves are provided on the outer circumferential surface of the body of an insert holder. A first holding surface of an insert first holding part, which is inserted between a groove bottom and a first protrusion, and a first protrusion surface of the first protrusion make surface contact and said surfaces are sloped so as to approach the groove bottom as the first end is approached. A second holding surface of an insert second holding part, which is inserted between the groove bottom and a second protrusion, and a second protrusion surface of the second protrusion make surface contact and said surface are sloped so as to approach the groove bottom as the second end is approached.

7 Claims, 10 Drawing Sheets

(58) Field of Classification Search
CPC .......... B23D 2277/06; B23D 2277/064; B23D 2277/068; B23D 2277/32; B23D 2277/58; B23D 2277/70; B23D 2277/84; B23F 5/22; B23F 5/24; B23F 9/08; B23F 9/082; B23F 11/00; B23F 21/16; B23F 21/163; B23F 21/18; B23F 21/183; B23F 51/04; B23F 51/046; B23F 5/163; B23C 5/02

See application file for complete search history.

(56) References Cited

U.S. PATENT DOCUMENTS

| | | | | |
|---|---|---|---|---|
| 1,243,502 A | * | 10/1917 | Frick | B23B 29/03478 408/150 |
| 1,373,717 A | | 4/1921 | Enlund | |
| 1,393,818 A | | 10/1921 | Olson | |
| 1,460,427 A | | 7/1923 | Mills | |
| 1,472,798 A | * | 11/1923 | Gylisdorff | B23D 77/00 408/233 |
| 1,522,145 A | * | 1/1925 | Rottler | B23D 77/02 408/229 |
| 1,611,186 A | * | 12/1926 | Habart | B23D 77/042 408/154 |
| 1,635,067 A | | 7/1927 | James | |
| 1,716,455 A | * | 6/1929 | Miller | B23D 77/02 408/116 |
| 2,164,620 A | * | 7/1939 | Parish | B23C 5/2295 407/43 |
| 3,819,289 A | | 6/1974 | Carroll | |
| 4,461,602 A | | 7/1984 | Zettl | |
| 2002/0164219 A1 | * | 11/2002 | Burnette | E01F 13/06 408/227 |
| 2011/0020083 A1 | | 1/2011 | Gauggel | |

FOREIGN PATENT DOCUMENTS

| | | | | |
|---|---|---|---|---|
| CN | 204552620 U | | 8/2015 | |
| DE | 361825 C | | 10/1922 | |
| DE | 373880 C | * | 4/1923 | .......... B23D 77/042 |
| DE | 396068 C | | 5/1924 | |
| DE | 574699 C | * | 4/1933 | .......... B23D 77/025 |
| DE | 1961862 A1 | * | 6/1971 | ............ B23D 77/02 |
| DE | 102006043616 A1 | | 5/2008 | |
| EP | 2266739 A1 | | 12/2010 | |
| GB | 952214 A | * | 3/1964 | ............ B23D 77/04 |
| JP | 57-189732 U | | 12/1982 | |
| JP | 58-120412 A | | 7/1983 | |
| JP | S61-33818 A | | 2/1986 | |
| JP | 62-127726 U | | 8/1987 | |
| JP | 11-114721 A | | 4/1999 | |
| JP | 2012-500127 A | | 1/2012 | |

OTHER PUBLICATIONS

Written Opinion dated Feb. 21, 2017, issued in counterpart application No. PCT/JP2016/086190 (6 pages).

Office Action dated Dec. 6, 2019, issued in counterpart CN Application No. 201680090097.7, with English translation. (17 pages).

Office Action dated Mar. 6, 2020, issued in counterpart CA application No. 3,044,780. (3 pages).

Extended (Supplementary) European Search Report dated Jun. 5, 2020, issued in counterpart EP Application No. 16923472.1. (15 pages).

Notification of Transmittal of Copies of Translation of the International Preliminary Report on Patentability (Forms PCT/IB/326) issued in counterpart International Application No. PCT/JP2016/086190 dated Jun. 20, 2019 with Forms PCT/IB/373 and PCT/ISA/237, with English translation (19 pages).

* cited by examiner

CUTTING TOOL, INSERT HOLDER AND INSERT

TECHNICAL FIELD

This invention relates to cutting tools, insert holders, and inserts, and more particularly to a cutting tool, an insert holder, and an insert with higher cutting stability and cutting accuracy.

BACKGROUND ART

There have been conventionally known cutting tools having a plurality of inserts with cutting portions for cutting a workpiece and an insert holder detachably holding the inserts to facilitate replacement of the cutting portions (Patent Literature 1). In Patent Literature 1, elongated inserts are held in an insert holder using annular members that sandwich the inserts from their opposite ends.

CITATION LIST

Patent Literature

Patent Literature 1: Japanese Patent Application Laid-Open No. H11(1999)-114721

SUMMARY OF INVENTION

Technical Problem

In Patent Literature 1, however, the surfaces on which the opposite ends of the inserts make contact with the annular members are perpendicular to, or in parallel with the axis of the insert holder. The insert holder has clearance to fit the inserts therein. The clearance may cause variations in the distance of the inserts from the axis of the insert holder, and may change the distance from the axis of the insert holder to the inserts during cutting operations. As a result, workpiece load concentration on some inserts and insert vibrations during cutting operations may occur, and these may cause reduction in cutting stability and cutting accuracy.

The present invention has been made to solve the aforementioned problem, and has an object to provide a cutting tool, an insert holder, and an insert with improved cutting stability and cutting accuracy.

Solution to Problem and Advantageous Effects of Invention

The cutting tool according to a first aspect is secured by a first end to a rotary drive device and is rotated about an axis by the rotary chive device to cut a workpiece, and includes a shaft-like insert holder, and a plurality of inserts detachably held in the insert holder. The insert holder has the first end and a second end at the opposite ends, and includes a body and a lid attached to the second end side of the body. The body is provided with a plurality of grooves on the outer circumferential surface, the grooves being closed on the first end side, and open on the second end side, and first projecting portions that are spaced a predetermined distance apart from groove bottoms of the grooves and project from the first end side of the grooves toward the second end. The lid includes second projecting portions that, when the lid is attached to the body, are spaced a predetermined distance apart from the groove bottoms and project toward the first end. The inserts include base portions and cutting portions that stick out from the outer circumferential surface of the insert holder while the base portions are inserted in the grooves. The base portions include first retaining portions to be interposed between the groove bottoms and first projecting portions, and second retaining portions to be interposed between the groove bottoms and second projecting portions. The first projecting portions have first projecting faces formed on the side of the first retaining portions, and the first projecting faces are angled toward the groove bottoms as they extend toward the first end. The second projecting portions have second projecting faces on the side of the second retaining portions, and the second projecting faces are angled toward the groove bottoms as they extend toward the second end. The first retaining faces of the first retaining portions make surface-contact with the first projecting faces, while the second retaining faces of the second retaining portions make surface-contact with the second projecting faces. Since the inserts are pressed against the body by means of the angled surfaces, the variations in the distance from the axis to the cutting portion of the inserts can be reduced, and also the inserts are prevented from being easily detached from the body during cutting operations. Consequently, load concentration to some of the inserts and vibrations in the inserts can be reduced, thereby improving the stability and cutting accuracy of the cutting tool during cutting operations.

According to the cutting tool of a second aspect, the angle formed by the first projecting faces and the groove bottoms is equal teethe angle formed by the second projecting faces and the groove bottoms. The maximum distance from the groove bottoms to the second projecting faces is set to be greater than the minimum distance from the groove bottoms to the first projecting faces, and the maximum distance from the groove bottoms to the first projecting faces is set to be greater than the minimum distance from the groove bottoms to the second projecting faces. According to the configurations there exist identically-shaped areas in the space between the groove bottoms and first projecting faces and the spaces between the groove bottoms and second projecting faces. Because of this, the second retaining portions, instead of the first retaining portions, can be inserted between the groove bottoms and first projecting portions, and the first retaining portions, instead of the second retaining portions, can be inserted between the groove bottoms and second projecting portions. Thus, the orientation of the inserts in the insert holder can be changed in accordance with the degree of wear of the cutting portions of the inserts, and therefore, in addition to the effect provided by the first aspect, the cutting tool has the effect of extending the life of the inserts.

According to the cutting tool of a third aspect the lid has a through hole at the center in the axial direction. The through hole has a diameter smaller than that of a head of a bolt, and receives a shank of the bolt. The lid is secured to the body by inserting a single bolt into the axially center through hole. In comparison with the case where a plurality of bolts are provided to the body in the circumferential direction, the space for the bolts can be reduced, and therefore the outer diameter of the insert holder can be decreased. Consequently, in addition to the effect provided by the first aspect, the cutting tool has the effect of increasing the degree of freedom in designing the outer diameter of the cutting tool.

According to the cutting tool of a fourth aspect, the body includes a first tubular portion on the second end side, and a second tubular portion extending from the first tubular portion to the first end. The second tubular portion has an inner diameter greater than that of the first tubular portion, and therefore the rotary drive device inserted into the second tubular portion can make contact with an end face of the first tubular portion. While the rotary drive device is in contact with the end face of the first tubular portion, the bolt is inserted into the through hole and the first tubular portion, and is coupled to the rotary drive device. Thus, the lid is secured to the body with the lid and body interposed between the head of the bolt and the rotary drive device. The bolt securing the lid to the body also secures the cutting tool to the rotary chive device, and therefore, in addition to the effect provided by the third aspect, the cutting tool has the effect of reducing the number of parts.

According to the cutting tool of a fifth aspect, when the inserts are held in the insert holder, the inserts reach the second end of the insert holder, and therefore the inserts at the second end of the insert holder can be used to cut a workpiece. In addition, the second projecting portions project into the grooves from the lid having an outer diameter smaller than that of the body, and therefore, the grooves are located outside the second projecting portions, and also the grooves are open on the outside of the lid and on the second end side of the body. Thus, the inserts held in the insert holder reach the second end of the cutting tool, and also can be situated in the grooves to the second end side of the body. This configuration allows the body to support the inserts in the grooves under a force in the circumferential direction applied during cutting operations. As a result, in addition to the effect provided by the first aspect, the cutting tool has the effect of cutting the workpiece with the inserts at the second end of the insert holder and acquiring the capability of retaining the second side of the inserts.

According to the cutting tool of a sixth aspect, the second projecting, portions are continuously formed in the circumferential direction of the insert holder. A plurality of recesses are formed in the body to connect the grooves. The circumferentially-continuous second projecting portions are inserted into the recesses, and therefore the second projecting portions can project into the grooves without interfering with the body. In comparison with the case where the second projecting portions are separately formed in the circumferential direction of the insert holder, the second projecting portions continuously formed in the circumferential direction can be manufactured easily. Thus, in addition to the effect provided by the fifth aspect, the cutting tool has the effect of easily manufacturing the lid.

The insert holder according to a seventh aspect is used in the cutting tool described in the first aspect and has an effect of the first aspect.

The insert according to an eighth aspect is used in the cutting tool described in the first aspect and has an effect of the first aspect.

DESCRIPTION OF EMBODIMENTS

Figure 1:
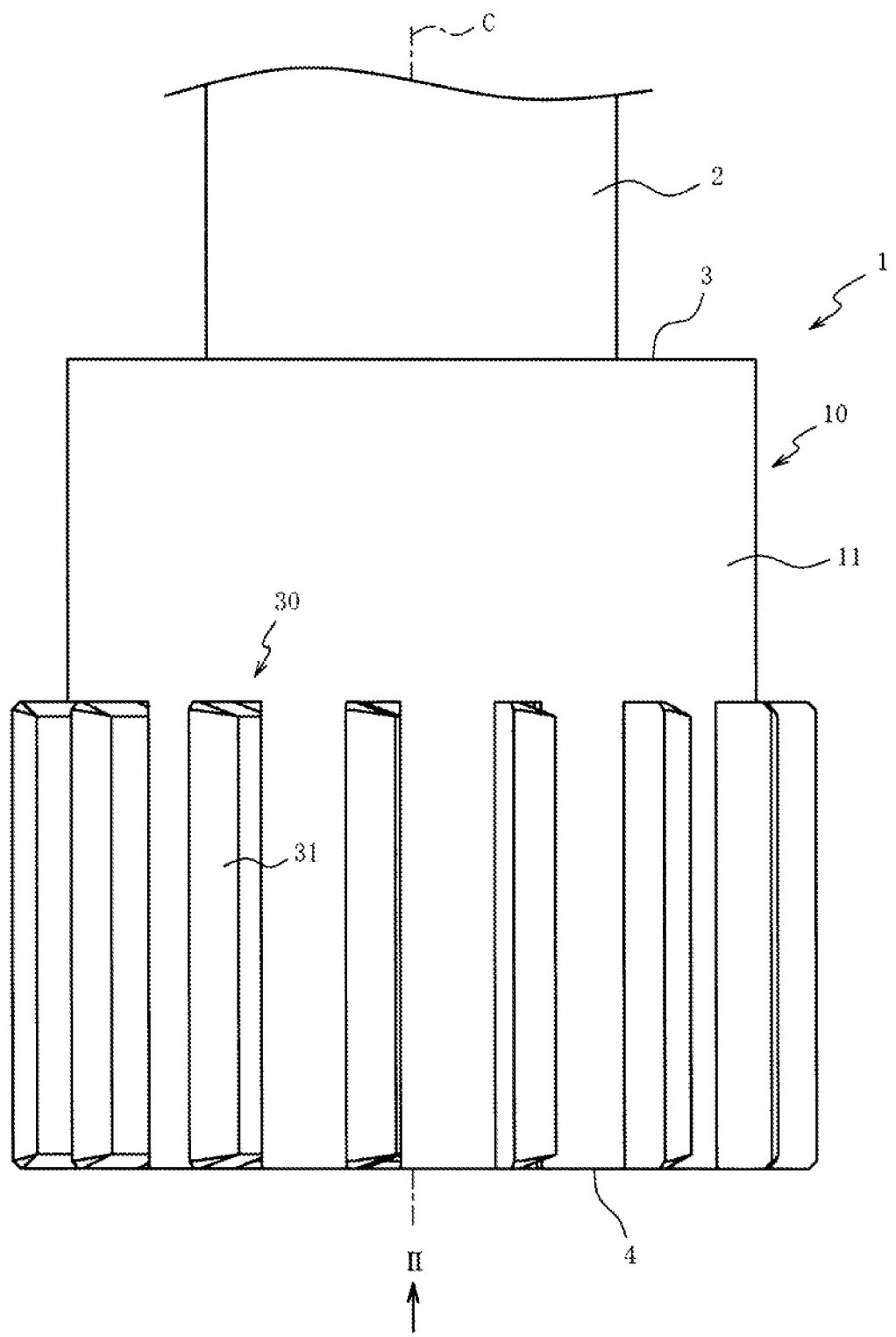
FIG. 1 is a front view of the culling tool according to the first embodiment of the invention.
Figure 2:
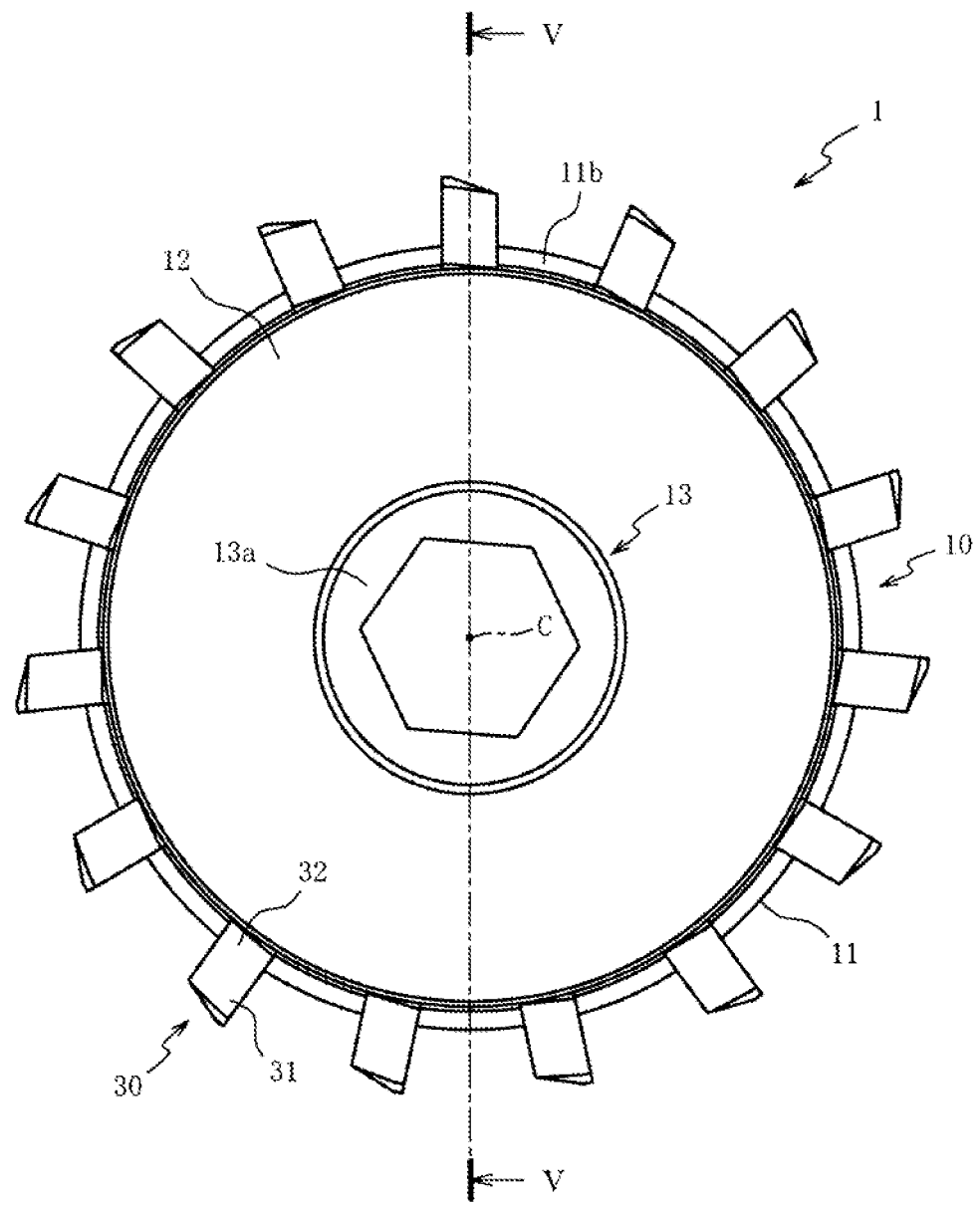
FIG. 2 is a bottom view of the cutting tool as viewed in the direction of Arrow II in FIG. 1.

With reference to the accompanying drawings, preferred embodiments of the present invention will be described below. First, a cutting tool 1 according to the first embodiment of the invention will be described by referring to FIGS. 1 and 2. FIG. 1 is a front view of the cutting tool 1 according to the first embodiment of the invention. FIG. 2 is a bottom view of the cutting tool 1 as viewed in the direction of Arrow II in FIG. 1.

As shown in FIGS. 1 and 2, the cutting tool 1 is secured to a rotary drive device 2, such as an arbor, for use. The rotary drive device 2 has a cylindrical tip with an axis C passing through its center, and rotates the tip about the axis C with a driving force from a driving source (not shown). With the rotation of the tip of the rotary drive device 2 about the axis C, the cutting tool 1 rotates to cut a workpiece.

The cutting tool 1 is made of cemented carbide such as pressed and sintered tungsten carbide. Note that the material of the cutting tool 1 is not limited to the cemented carbide, and can be made of, for example, high-speed tool steel.

The cutting tool 1 is a shaft-like tool with a first end 3 on one side closer to the rotary drive device 2, and a second end 4 on the other side remote from the rotary drive device 2. The first end 3 and second end 4 of the cutting tool 1 in this embodiment are referred to as simply "the first end 3" and "the second end 4" without "of the cutting tool 1" in the following description.

The cutting tool 1 includes a shaft-like insert holder 10 having the first end 3 and second end 4 at the opposite ends, and inserts 30 detachably held in the insert holder 10. The insert holder 10 includes a shaft-like body 11, a lid 12 attached to the second end 4 side of the body 11, and a bolt 13 securing the lid 12 to the body 11. The bolt 13 is a hexagon socket head bolt having a cylindrical head 13a with a hexagon socket formed therein.

The inserts 30 held in the insert holder 10 have cutting portions 31 sticking out from the outer circumferential surface of the insert holder 10. The cutting portions 31 are used to cut workpieces, and, in this embodiment, are designed specifically for a reamer. Thus, the cutting tool 1 is used as a reamer to enlarge or reshape holes drilled in workpieces by different tools.

Figure 3:
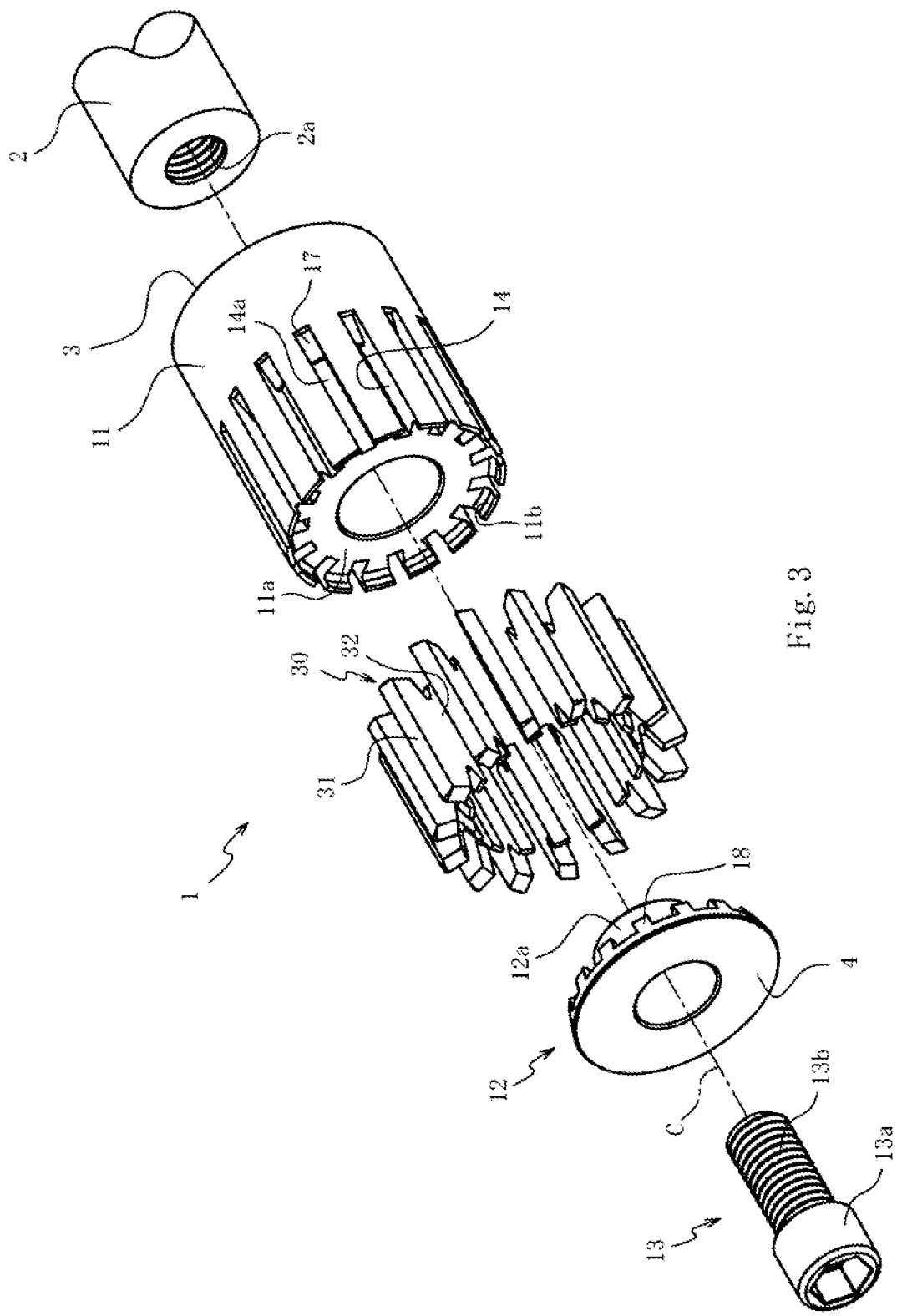
FIG. 3 is an exploded view of the cutting tool.
Figure 4:
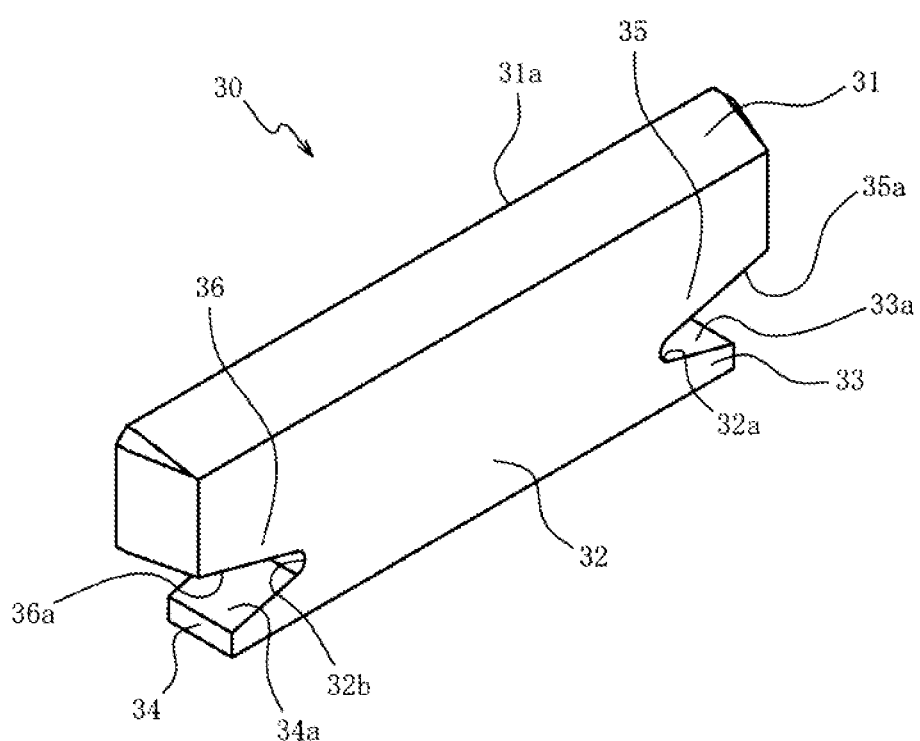
FIG. 4 is a perspective view of an insert.
Figure 5:
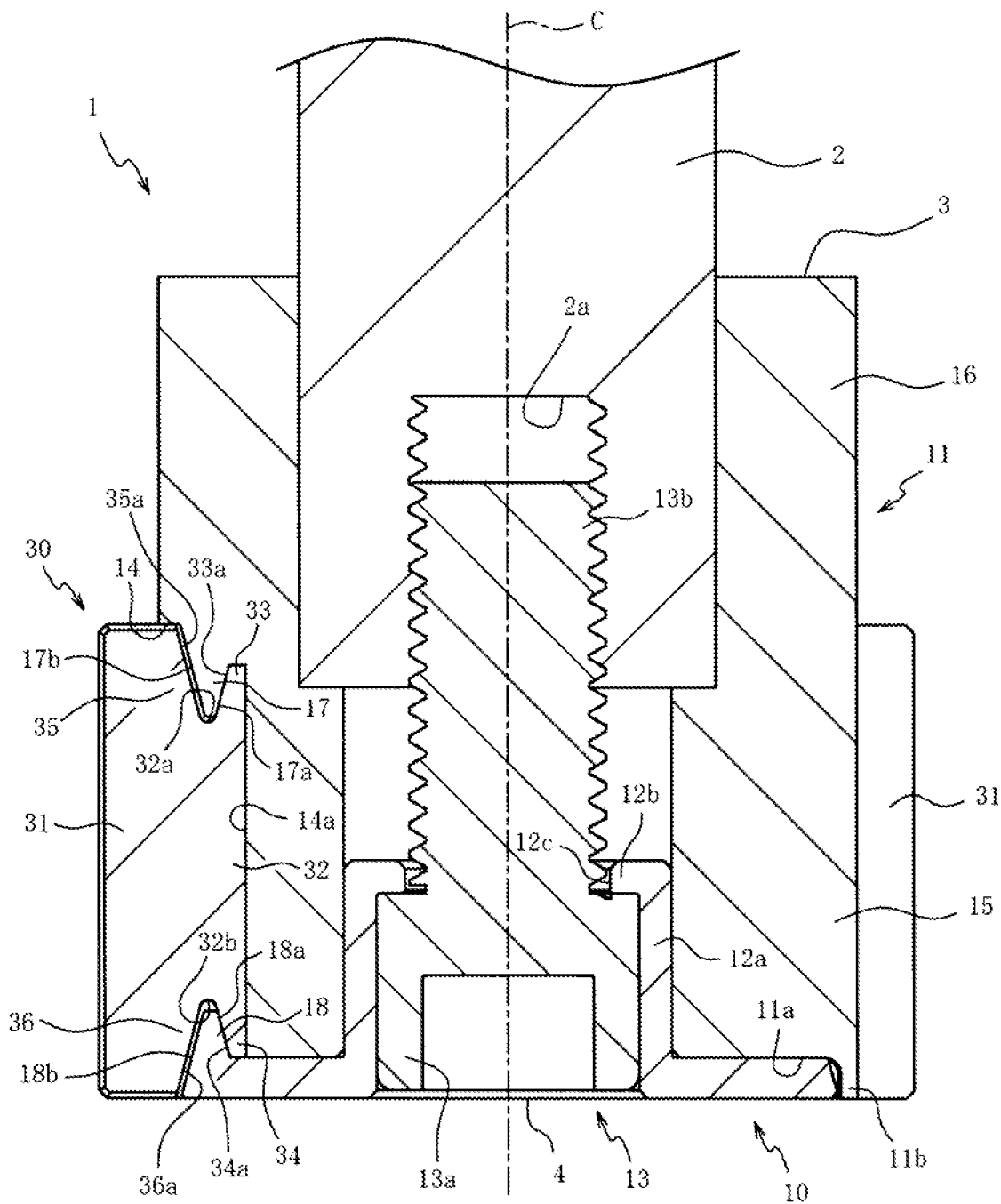
FIG. 5 is a cross-sectional view of the cutting tool taken along Line V-V in FIG. 2.

Referring to FIGS. 3, 4, and 5, individual parts of the cutting tool 1 will be described in detail. FIG. 3 is an exploded view of the cutting tool 1. FIG. 4 is a perspective view of an insert 30. FIG. 5 is a cross-sectional view of the cutting tool 1 taken along Line V-V in FIG. 2.

As shown in FIG. 3, the body 11 is a cylindrical member. The body 11 has a plurality of grooves 14 equally spaced on the outer circumferential surface. On an end face 11a of the body 11 on the second end 4 side, projecting pieces 11b are formed so as to stick out from the peripheral edge. The projecting pieces 11b are separated by the grooves 14 in the circumferential direction. The number of the grooves 14 can be changed as required, and in this embodiment, fifteen grooves 14 are provided.

The grooves 14 are formed to receive the inserts 30, and are arranged in parallel with the axis C. The grooves 14 are closed on the first end 3 side, and open on the second end 4 side and have openings on the end face 11a of the body 11. The grooves 14 have smooth flat groove bottoms 14a on a side closer to the axis C. The grooves 14 also have smooth flat side faces extending along the axis C so as to connect the groove bottoms 14a and the outer circumferential surface of the body 11.

The body 11 is provided with first projecting portions 17 that are placed inside the grooves 14 with a predetermined distance apart from the groove bottoms 14a of the grooves 14, and project from the first end 3 side of the grooves 14 toward the second end 4. The first projecting portions 17 are formed in a substantially uniform manner in the width direction of the grooves 14 or in the circumferential direction of the body 11.

The lid 12 is a disk-like member, and has a lid's cylindrical portion 12a in which a bolt 13 is inserted, at the center in a direction perpendicular to the axis C (hereinafter, referred to as "a direction perpendicular to the axis"). The lid 12 has second projecting portions 18 that project from the outer peripheral edge of the lid 12 toward the first end 3, and are arranged to align with the grooves 14. The head 13a of the bolt 13 is fit in the lid's cylindrical portion 12a, while the shank 13b of the bolt 13 sticks out of a through hole 12c (see FIG. 5) formed in the lid's cylindrical portion 12a.

As shown in FIG. 4, the insert 30 is an elongated member including a cutting portion 31 and a base portion 32 formed in one piece. The cutting portion 31 has a cutting edge 31a on a ridge at one side in the width direction. The cutting edge 31a digs into workpieces to cut the workpieces.

The base portion 32 is a part to be inserted into a groove 14. The width of the base portion 32 is substantially equal to that of the groove 14. All of the longitudinal faces of the base portion 32 are finished smooth and flat. Such a base portion 32 can be smoothly inserted into the groove 14 with the smooth and flat groove bottom 14a and side faces.

The base portion 32 has V-shaped cut-out portions 32a, 32b on the opposite ends in the longitudinal direction. The cut-out portions 32a, 32b are provided to avoid interference between the first projecting portion 17 and second projecting portion 18 when the base portion is held in the insert holder 10 (when inserted into the groove 14). The base portion 32 is shaped to match the shape of the groove 14.

Returning to FIG. 3, a description of how to assemble the cutting tool 1 with the aforementioned insert holder 10 and inserts 30 will be given. First, the inserts 30 are inserted into the grooves 14 of the body 11. At this moment, the first projecting portions 17 are inserted into the cut-out portions 32a.

Then, while the second projecting portions 18 are inserted into the grooves 14, the lid's cylindrical portion 12a is inserted into the inner circumference of the body 11 until the lid 12 makes contact with the end face 11a of the body 11. At this moment, the grooves 14 are partially closed on the second end 4 side by the lid 12, and the second projecting portions 18 are inserted in the cut-out portions 32b. Subsequently, the bolt 13 is inserted into the lid's cylindrical portion 12a until the shank 13b of the bolt 13 sticks out from the lid's cylindrical portion 12a to the inner circumference of the body 11. Lastly, the bolt 13 is tightly screwed into a bolt hole 2a provided at the tip of the rotary drive device 2.

The cutting tool 1 is assembled in this manner as shown in FIG. 5. The lid's cylindrical portion 12a has a bottom 12b on the first end 3 side. The bottom 12b has a through hole 12c at the center in the direction perpendicular to the axis. The through hole 12c is smaller in diameter than the head 13a of the bolt 13, but larger in diameter than the shank 13b of the bolt 13.

In addition, the body 11 includes a first tubular portion 15 on the second end 4 side, and a second tubular portion 16 extending from the first tubular portion 15 to the first end 3. The first tubular portion 15 and second tubular portion 16 have the same outer diameter and a continuously-formed outer circumferential surface. The first tubular portion 15 has an inner diameter larger than the outer diameter of the head 13a of the bolt 13, but smaller than the outer diameter of the tip of the rotary drive device 2. The second tubular portion 16 has an inner diameter larger than the inner diameter of the first tubular portion 15, and being substantially equal to the outer diameter of the tip of the rotary drive device 2. These configurations allow the tip of the rotary drive device 2 inserted in the second tubular portion 16 to make contact with an end face of the first tubular portion 15 on the first end 3 side.

Consequently, once the bolt 13 is tightly screwed in the bolt hole 2a, the lid 12 and body 11 are interposed between the head 13a of the bolt 13 and the rotary drive device 2, thereby securing the lid 12 to the body 11. The bolted joint by the bolt 13 secures the lid 12 to the body 11, and also secures the cutting tool 1 to the rotary drive device 2. Since both the securing of the lid 12 to the body 11 and the securing of the cutting tool 1 to the rotary drive device 2 can be made with the bolt 13, the number of components can be reduced in comparison with a case where the securing is made individually with different bolts 13.

In addition, the lid 12 is secured to the body 11 by one single bolt 13 with the first projecting portions 17 and second projecting portions 18 inserted in the cut-out portions 32a and cut-out portions 32b, respectively, which means that the plurality of inserts 30 can be secured to the insert holder 10 at a time. Therefore, the workability in assembling the cutting tool can be improved in comparison with a case where a plurality of inserts 30 are individually secured to the insert holder 10 with different bolts.

Suppose a plurality of inserts 30 are individually secured to the insert holder 10 with different bolts, the insert holder 10 is required to have space for a plurality of bolts to secure the inserts 30. On the other hand, since the plurality of inserts 30 are secured with one single bolt 13 in this embodiment, the space for the bolts 13 to secure the inserts 30 to the insert holder 10 can be reduced. Consequently, the space between the neighboring inserts 30 can be reduced, which makes the diameter of the cutting tool 1 smaller. Alternatively, the reduction of the space between the neighboring inserts 30 allows the number of the inserts 30 to increase, thereby improving the machining efficiency of the cutting tool 1.

The bolt 13 does not always need to be coupled with the rotary drive device 2. The bolt 13 may be screwed into the second tubular portion 16 that is formed with a solid cylindrical material. In this case, the cutting tool 1 is secured to the rotary drive device 2 with a fastening member different from the bolt 13. Separate use of the bolt 13 for securing the lid 12 to the body 11 and the fastening member for securing the cutting tool 1 to the rotary drive device 2 allows the cutting tool 1 to be detached from the rotary drive device 2 without disassembling the cutting tool 1. Examples of the fastening member to secure the cutting tool 1 to the rotary drive device 2, other than the bolt 13, include a bolt, a pin, and a drill chuck.

Alternatively, a plurality of bolts may be used to penetrate the lid 12 at several locations along the circumferential direction and pass through the lid 12 in the axis-C direction to couple with the first tubular portion 15. In this case, the first tubular portion 15 needs space for the bolts to be coupled, which imposes considerable constraints on the body 11 to reduce its outer diameter.

However, in this embodiment, the lid 12 is secured to the body 11 with the single bolt 13 inserted into the through hole 12c formed at the center of the lid 12 in the direction perpendicular to the axis, which relaxes the constraints on the body 11 to reduce its outer diameter in comparison with the case where the first tubular portion 15 is required to save space for the bolts to be screwed at the locations along the circumferential direction. Thus, the outer diameter of the body 11 can be altered with a greater degree of freedom, thereby increasing the degree of freedom in designing the outer diameter of the cutting tool 1.

The relationship between the individual components of the cutting tool 1 will be described with continuous reference to FIG. 5. The lid's cylindrical portion 12a has an inner diameter substantially equal to the outer diameter of the head 13a of the bolt 13, and an outer diameter substantially equal to the inner diameter of the first tubular portion 15. In addition, since the inner diameter of the second tubular portion 16 is configured to be substantially equal to the outer diameter of the tip of the rotary drive device 2, the cutting tool 1 is prevented from rattling on the rotary drive device 2.

The lid's cylindrical portion 12a in which the head 13a of the bolt 13 fits has a depth (distance from the bottom 12b to the end face of the lid 12 on the second end 4 side) greater than the dimension of the head 13a of the bolt 13 in the axis-C direction. Therefore, the bolt 13 with the head 13a thereof fitted in the lid's cylindrical portion 12a can be configured not to stick out of the end face of the lid 12 on the second end 4 side (second end 4 of the cutting tool 1).

If the bolt 13 sticks out of the second end 4 of the cutting tool 1 during cutting operations, the bolt 13 easily makes contact with the workpiece. The bolt 13 making contact with the workpiece receives from the workpiece a force in the direction in which the bolt 13 is loosened or tightened. However, in this embodiment, the bolt 13 can be configured not to stick out of the second end 4 of the cutting tool 1, and therefore the bolt 13 can avoid making contact with the workpiece during cutting operations. This configuration can prevent the bolt 13 from being loosened or tightened too much during cutting operations.

The groove 14 is mainly formed in the first tubular portion 15 and slightly in the second tubular portion 16. In this case, the inner circumferential surface of the second tubular portion 16 needs to be located closer to the axis C than the groove bottom 14a of the groove 14, which imposes considerable constraints on the second tubular portion 16 to reduce its diameter and on the groove 14 to increase its depth (i.e., to increase the dimension of the base portion 32 in the direction perpendicular to the axis).

It is also possible to form the groove 14 only in the first tubular portion 15 rather than the second tubular portion 16. In this case, the groove bottom 14a of the groove 14 can be located closer to the axis C beyond the inner circumferential surface of the second tubular portion 16. This can relax the constraints to reduce the diameter of the second tubular portion 16 and increase the depth of the groove 14.

Reduction in diameter of the second tubular portion 16 can reduce the diameter of the body 11, and results in diameter reduction of the cutting tool 1. In addition, since the base portion 32 is formed so as to match the shape of the groove 14, an increase in depth of the groove 14 can increase the dimension of the base portion 32 in the direction perpendicular to the axis, thereby expanding the area where the insert holder 10 receives a load from the insert 30 during cutting operations. As a result, the load imposed on the insert 30 and insert holder 10 can be dispersed, thereby improving the durability of the insert 30 and insert holder 10.

The first projecting portion 17 is spaced a predetermined distance apart from the groove bottom 14a of the groove 14 and projects into the groove 14 from the first end 3 side of the groove 14 toward the second end 4. The second projecting portion 18 is placed a predetermined distance apart from the groove bottom 14a when the lid 12 is attached to the body 11, and projects into the groove 14.

The first projecting portion 17 has a first inner face 17a located closer to the groove bottom 14a, and a first outer face 17b located farther from the groove bottom 14a. The first inner face 17a is angled toward the groove bottom 14a as it extends toward the first end 3. The first outer face 17b is angled toward the groove bottom 14a as it extends toward the second end 4. The first projecting portion 17 formed as described above projects in the shape of V into the grooves 14 toward the second end 4.

The second projecting portion 18 has a second inner face 18a located closer to the groove bottom 14a, and a second outer face 18b located farther from the groove bottom 14a. The second outer face 18b is also an outer circumferential surface of the lid 12. The second inner face 18a is angled toward the groove bottom 14a as it extends toward the second end 4. The second outer face 18b is angled toward the groove bottom 14a as it extends toward the first end 3. The second projecting portion 18 formed as described above projects in the shape of V into the grooves 14 toward the first end 3.

The angle formed by the first inner face 17a and groove bottom 14a is set to be equal to the angle formed by the second inner face 18a and groove bottom 14a. The angle formed by the first outer face 17b and groove bottom 14a is also set to be equal to the angle formed by the second outer face 18b and groove bottom 14a. In addition, the dimensions of the first outer face 17b and second outer face 18h in the axis-C direction are greater than the dimensions of the first inner face 17a and first outer face 17b second inner face 18a in the axis-C direction, respectively, by the thickness of the lid 12.

The minimum distance between the groove bottom 14a and the first inner face 17a (distance between them at the closest point to the first end 3) in the direction perpendicular to the axis is set to be equal to the minimum distance between the groove bottom 14a and the second inner face 18a (distance between them at the closest point to the second end 4) in the direction perpendicular to the axis. The maximum distance between the groove bottom 14a and the first inner face 17a (distance between them at the closest point to the second end 4) in the direction perpendicular to the axis is set to be equal to the maximum distance between the groove bottom 14a and the second inner face 18a (distance between them at the closest point to the first end 3) in the direction perpendicular to the axis.

As described above, the first projecting portion 17 and second projecting portion 18 are set to be symmetrical (symmetrical in the axis-C direction), and are substantially identical in shape. The space between the groove bottom 14a and first inner face 17a (first projecting portion 17) and the space between the groove bottom 14a and second inner face 18a (second projecting portion 18) are set to be symmetrical, and identical in shape.

The base portion 32 includes a first retaining portion 33 interposed between the groove bottom 14a and first projecting portion 17, a second retaining portion 34 interposed between the groove bottom 14a and second projecting portion 18, a first peripheral portion 35 located outside the first projecting portion 17 in the direction perpendicular to the axis, and a second peripheral portion 36 located outside the second projecting portion 18 in the direction perpendicular to the axis.

More specifically, the base portion 32 has the first retaining portion 33 that is located closer to the axis C than the cut-out portion 32a, and the first peripheral portion 35 that is located outside the cut-out portion 32a in the direction perpendicular to the axis. In addition, the base portion 32 has the second retaining portion 34 that is located closer to the axis C than the cut-out portion 32b, and the second peripheral portion 36 that is located outside the cut-out portion 32b in the direction perpendicular to the axis.

The first retaining portion 33 has a first contact face 33a that makes contact with the first inner face 17a. The first contact face 33a substantially has the same shape as the first inner face 17a, and is angled toward the groove bottom 14a as it extends toward the first end 3. The angle formed by the first contact face 33a and groove bottom 14a is set to be equal to the angle formed by the first inner face 17a and groove bottom 14a.

The second retaining portion 34 has a second contact face 34a that makes contact with the second inner face 18a. The second contact face 34a substantially has the same shape as the second inner face 18a, and is angled toward the groove bottom 14a as it extends toward the second end 4. The angle formed by the second contact face 34a and groove bottom 14a is set to be equal to the angle formed by the second inner face 18a and groove bottom 14a.

The first contact face 33a and second contact face 34a configured as above make surface-contact with the first inner face 17a and second inner face 18a, respectively. When these surface contacts are made, a force directed toward the axis C is generated in the first retaining portion 33 and second retaining portion 34 due to their inclination, and the force pushes the base portion 32 against the groove bottom 14a (body 11). This can reduce the variations in distance from the axis C to the cutting portions 31 of the inserts 30, and also can make it difficult for the inserts 30 to be detached from the groove bottoms 14a during cutting operations. Consequently, load concentration on some of the inserts 30 and vibrations in the inserts 30 can be reduced, thereby improving the stability and cutting accuracy of the cutting tool 1 during cutting operations.

The first peripheral portion 35 has a first non-contact face 35a that faces the first outer face 17b. The first non-contact face 35a is formed in parallel with the first outer face 17b, and is angled toward the groove bottom 14a as it extends toward the second end 4. The second peripheral portion 36 has a second non-contact face 36a that faces the second outer face 18b. The second non-contact face 36a is formed in parallel with the second outer face 18b, and is angled toward the groove bottom 14a as it extends toward the first end 3.

The dimensions of the faces are configured such that, when the first inner face 17a and second inner face 18a are in surface-contact with the first contact face 33a and second contact face 34a, respectively, the first non-contact face 35a is not in contact with the first outer face 17b, and the second non-contact face 36a is not in contact with the second outer face 18b. In addition, the dimensions of the faces are configured such that, when the first inner face 17a and second inner face 18a are in surface-contact with the first contact face 33a and second contact face 34a, respectively, the tip of the first retaining portion 33, the tip of the second retaining portion 34, the bottom of a valley formed by the first retaining portion 33 and first peripheral portion 35, and the bottom of a valley formed by the second retaining portion 34 and second peripheral portion 36 are not in contact with the insert holder 10.

According to the configurations, a pressing force of the inserts 30 to the body 11 due to the surface contact between the first inner face 17a and first contact face 33a and the surface contact between the second inner face 18a and second contact face 34a can be maintained without interference between other areas of the insert holder 10 and inserts 30.

The cutting portions 31 of the inserts 30 extend to the second end 4, and therefore the cutting tool 1 can cut the workpiece with the cutting portions 31 at the second end. Even if the drilled hole in the workpiece is a blind hole, the cutting portions 31 can cut the bottom of the hole.

Let us now consider a case where the base portion 32 (second peripheral portion 36) does not extend to the second end 4, but only the cutting portion 31 reaches the second end 4. In this case, the cutting portion 31 extends to the second end 4 outside the groove 14 with respect to the base portion 32. If the extending part of the cutting portion 31 receives load in the circumferential direction from the workpiece during cutting operations, the insert holder 10 cannot support the extending part from the opposite side to the workpiece. This may cause breakage and bending of the cutting portion 31.

However, in this embodiment, the second projecting portion 18 projects into the groove 14 from the lid 12 having an outer diameter smaller than that of the body 11, and resultantly the groove 14 in which the base portion 32 can be inserted is located outside the second projecting portion 18, and also the groove 14 opens on the end face 11a of the body 11 outside the periphery of the lid 12. This configuration allows the base portion 32 (second peripheral portion 36) placed inside the groove 14 to reach the end face 11a (second end 4 side) of the body 11. Therefore, when the inserts 30 receive circumferential load on the second end 4 from the workpiece, the body 11 can support the second end 4 side of the inserts 30 in the grooves 14 from the opposite side to the workpiece. As a result, the cutting tool 1 can cut the workpiece by using the inserts 30 at the second end 4, and also can acquire the capability of retaining the second end 4 side of the inserts 30.

In addition, the end face 11a of the body 11 on the second end 4 side has the projecting pieces 11b sticking out from the outer peripheral edge to the second end 4. The projecting pieces 11b can support the base portions 32 from the end face 11a of the body 11 to the second end 4 against the circumferential load from the workpiece. Consequently, the capability of retaining the second end 4 side of the inserts 30 can be further improved.

The first projecting portion 17 and second projecting portion 18 are symmetrical to each other in shape, in other words, the groove 14 with the lid 12 attached thereto is symmetrical top to bottom, and the top half and bottom half of the groove 14 including the lid 12 are substantially identical in shape. In addition, the insert 30 is symmetrical top to bottom. These configurations allow the body 11 to support the first peripheral portions 35 in the grooves 14 in the same manner in which the body 11 supports the second peripheral portions 36 in the grooves 14 when the inserts 30 receive circumferential load from the workpiece. Thus, the cutting tool can have the inserts 30 extended toward the first end 3, while acquiring the capability of retaining the first end 3 side of the inserts 30.

The first non-contact face 35a is formed in parallel with the first outer face 17b, and the second non-contact face 36a is formed in parallel with the second outer face 18b, and therefore the first non-contact face 35a and second non-contact face 36a can be placed in the closest proximity to the first outer face 17b and second outer face 18b, respectively, while keeping them out of contact with each other. This configuration allows the first peripheral portion 35 and second peripheral portion 36 in the groove 14 to have enough dimensions in the direction perpendicular to the axis. As a result, the load applied between the first peripheral portions 35 and second peripheral portions 36 and the insert holder 10 during cutting operations can be widely dispersed, thereby improving the durability of the inserts 30 and insert holder 10.

According to the cutting tool 1 of the above-described embodiment, the space between the groove bottom 14a and first projecting portion 17 and the space between the groove bottom 14a and second projecting portion 18 are symmetrical and identical in shape. In addition, the first retaining portion 33 and second retaining portion 34 are also symmetrical and identical in shape. Because of this, the insert 30 that is turned upside down can be inserted into the groove 14 by inserting the second retaining portion 34 between the groove bottom 14a and first projecting portion 17 instead of the first retaining portion 33, and inserting the first retaining portion 33 between the groove bottom 14a and second projecting portion 18 instead of the second retaining portion 34.

The cutting portions 31 of the inserts 30 are more susceptible to wear on the second end 4 side than the first end 3 side. However, the life of the inserts 30 can be extended by changing the orientation of the inserts 30 in the insert holder 10 in accordance with the degree of wear of the cutting portions 31. In this embodiment, if the inserts 30 are turned upside down to change their orientation, the cutting edges 31a of the cutting portions 31 are also reversed, and therefore the cutting tool 1 is required to reverse its direction of the cutting rotation.

The grooves 14 with the first projecting portions 17 and second projecting portions 18 projecting therein are symmetrical top to bottom in shape. In addition, the inserts 30 are also symmetrical top to bottom in shape. Consequently, even if the inserts 30 are turned upside down, the inserts 30 do not interfere with the insert holder 10, and therefore the upside-down inserts 30 can fit in the grooves 14, and are even not difficult to fit in the grooves 14.

It is not necessary for the space between the groove bottoms 14a and first projecting portions 17 and the space between the groove bottoms 14a and second projecting portions 18 to be symmetrical to hold the upside-down inserts 30. The upside-down inserts 30 can be properly held as long as the angle formed by the first inner face 17a and groove bottom 14a is equal to the angle formed by the second inner face 18a and groove bottom 14a, the maximum distance from the groove bottom 14a to the second inner face 18a is set to be greater than the minimum distance from the groove bottom 14a to the first inner face 17a, and the maximum distance from the groove bottom 14a to the first inner face 17a is set to be greater than the minimum distance from the groove bottom 14a to the second inner face 18a.

By setting the dimensions as above, there exist symmetrical and identically-shaped areas in the space between the groove bottom 14a and first inner face 17a and the space between the groove bottom 14a and second inner face 18a. Therefore, the second retaining portion 34 can be interposed between the groove bottom 14a and first inner face 17a, and the first retaining portion 33 can be interposed between the groove bottom 14a and second inner face 18a. Thus, as described above, the life of the inserts 30 can be extended by changing the orientation of the inserts 30 in the insert holder 10 in accordance with the degree of wear of the cutting portions 31.

Next, with reference to FIG. 6, a cutting tool 40 according to the second embodiment will be described. In the first embodiment, the second projecting portions 18 are placed so as to align with the grooves 14, in other words, the second projecting portions 18 are formed separately along the insert holder 10 in the circumferential direction. In the second embodiment, on the other hand, the second projecting portions 45 are continuously formed along an insert holder 41 in the circumferential direction. Like components are denoted by like numerals as of the first embodiment and will not be further explained.

Figure 6:
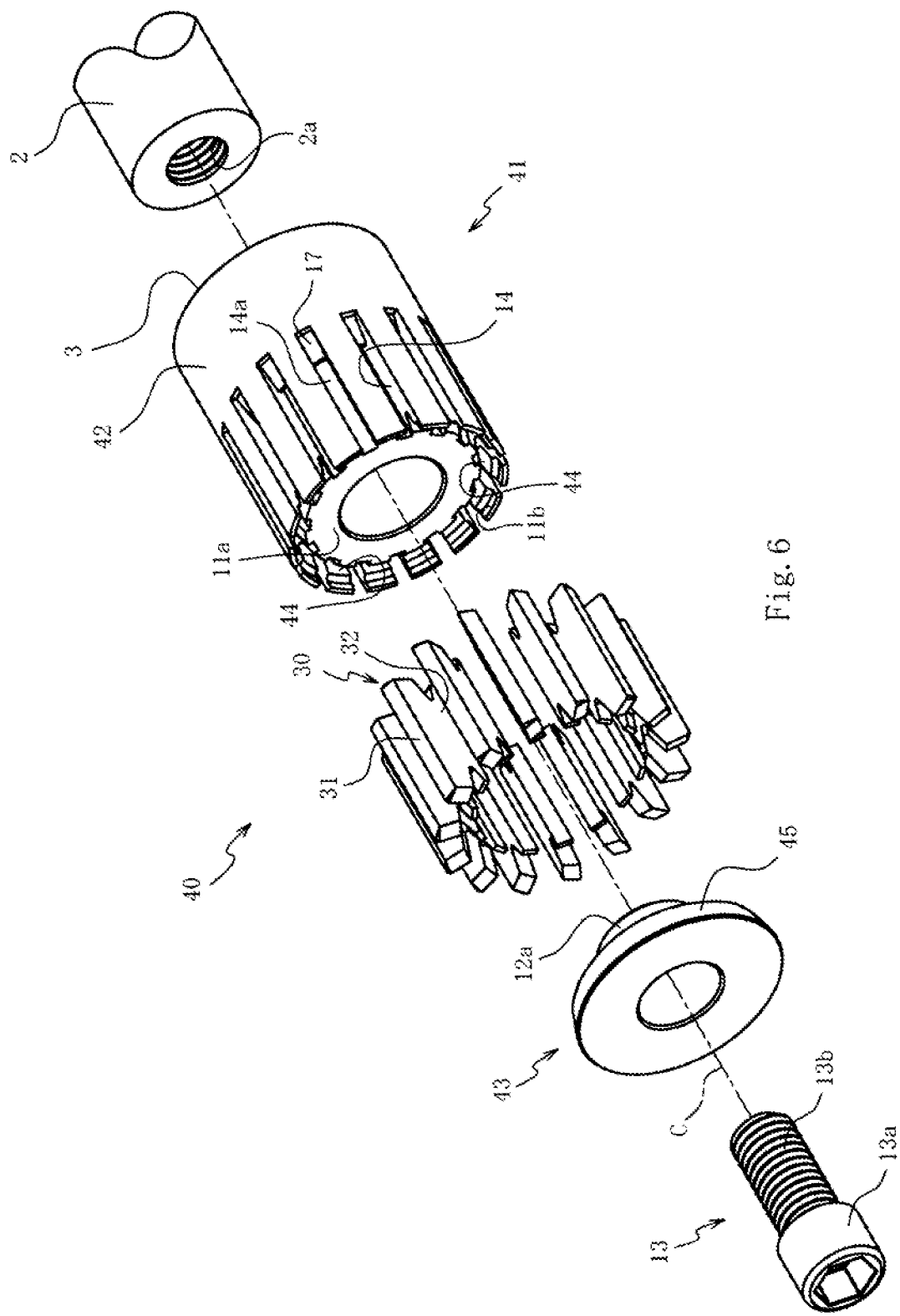
FIG. 6 is an exploded view of the cutting tool according to the second embodiment.

FIG. 6 is an exploded view of the cutting tool 40 according to the second embodiment. As shown in FIG. 6, the insert holder 41 of the cutting tool 40 includes a shaft-like body 42, a lid 43 attached to the second end 4 side of the body 42, and a bolt 13 securing the lid 43 to the body 42.

The body 42 is a cylindrical member. The body 42 has a plurality of grooves 14 equally spaced on the outer circumferential surface. The body 42 has an end face 11a with openings of the grooves 14 on the second end 4 side, and recesses 44 formed so as to connect the grooves 14 in the circumferential direction. The recesses 44 are dented parts made from the end face 11a of the body 42 toward the first end 3.

The lid 43 is a disk-like member. The lid 43 has second projecting portions 45 that project from the outer peripheral edge of the lid 43 toward the first end 3. The second projecting portions 45 are continuously formed in the circumferential direction of the insert holder 41.

When the lid 43 is attached to the body 42, the second projecting portions 45 are inserted into the grooves 14, and also into the recesses 44. The shape and size of the recesses 44 are determined such that the body 42 with the lid 43 attached does not interfere with the second projecting portions 45.

According to the cutting tool 40 in the above-described second embodiment, the second projecting portions 45 are continuously formed in the circumferential direction of the insert holder 41. The lid 43 of the second embodiment can be readily manufactured in comparison with the lid having the second projecting portions 18 separately formed along the circumferential direction of the insert holder 41 as the first embodiment.

However, the second projecting portions 45 continuously formed in the circumferential direction require the recesses 44 on the end face 11a of the body 42 to avoid interference between second projecting portions 45 and body 42 when the lid 43 is attached to the body 42. The recesses 44 are formed so as to connect the openings of the grooves 14 on the end face 11a of the body 42 in the circumferential direction. In short, the recesses 44 can be formed by just making a ring-shaped dent in the circumferential direction; the formation of the recesses 44 is relatively easy.

In comparison with the case of separately forming the second projecting portions 18 in the circumferential direction without forming the recesses 44 as the first embodiment, continuously forming the second projecting portions 45 in the circumferential direction with the recesses 44 as the second embodiment can make it easier to manufacture the body 42 and lid 43. Consequently, the cutting tool 40 can be readily manufactured.

The recesses 44 are formed on the precondition that the second projecting portions 45 project into the grooves 14. If the second projecting portions 45 are designed not to project into the grooves 14 being open on the end face 11a of the body 42, the second projecting portions 45 do not interfere with the end face 11a of the body 42 irrespective of whether or not the second projecting portions 45 are formed continuously in the circumferential direction.

As described in the first embodiment, the lid 12 from which the second projecting portions 45 project into the grooves 14 has an outer diameter smaller than that of the body 42, and therefore, the grooves 14 in which the base portions 32 can be inserted are located outside the second projecting portions 45, and the openings of the grooves 14 on the end face 11a of the body 42 are located outside the periphery of the lid 12. This configuration allows the base portions 32 to be situated inside the grooves 14 to reach the end face 11a of the body 42. Therefore, when the inserts 30 receive circumferential load on the second end 4 from the workpiece, the body 42 can support the second end 4 side of the inserts 30 in the grooves 14 from the opposite side to the workpiece. Consequently, the capability of retaining the second end 4 side of the inserts 30 can be acquired.

As described above, the second projecting portions 45 in the second embodiment are formed on the lid 43, which is smaller in outer diameter than the body 42, so as to project into the grooves 14, and also are formed continuously in the circumferential direction. Consequently, the cutting tool 40 as described above can be manufactured readily, while maintaining the capability of retaining the second end 4 side of the inserts 30.

Next, with reference to FIGS. 7 to 10, a cutting tool 50 of the third embodiment will be described. The cutting tool 1 described in the first embodiment is a reamer. In the third embodiment, on the other hand, the cutting tool 50 is an end mill. Like components are denoted by like numerals as of the first embodiment and will not be farther explained.

Figure 7:
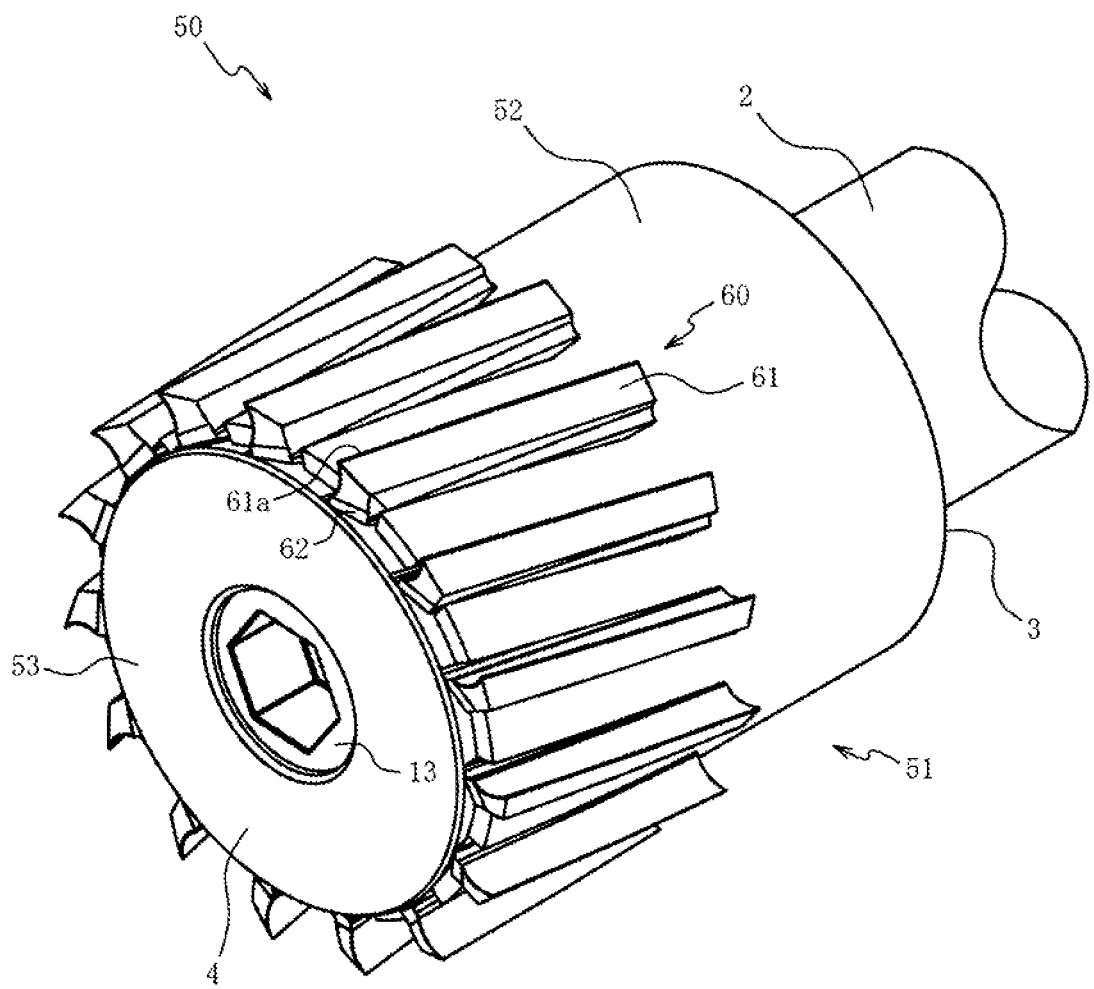
FIG. 7 is a perspective view of the cutting tool according to the third embodiment.
Figure 8:
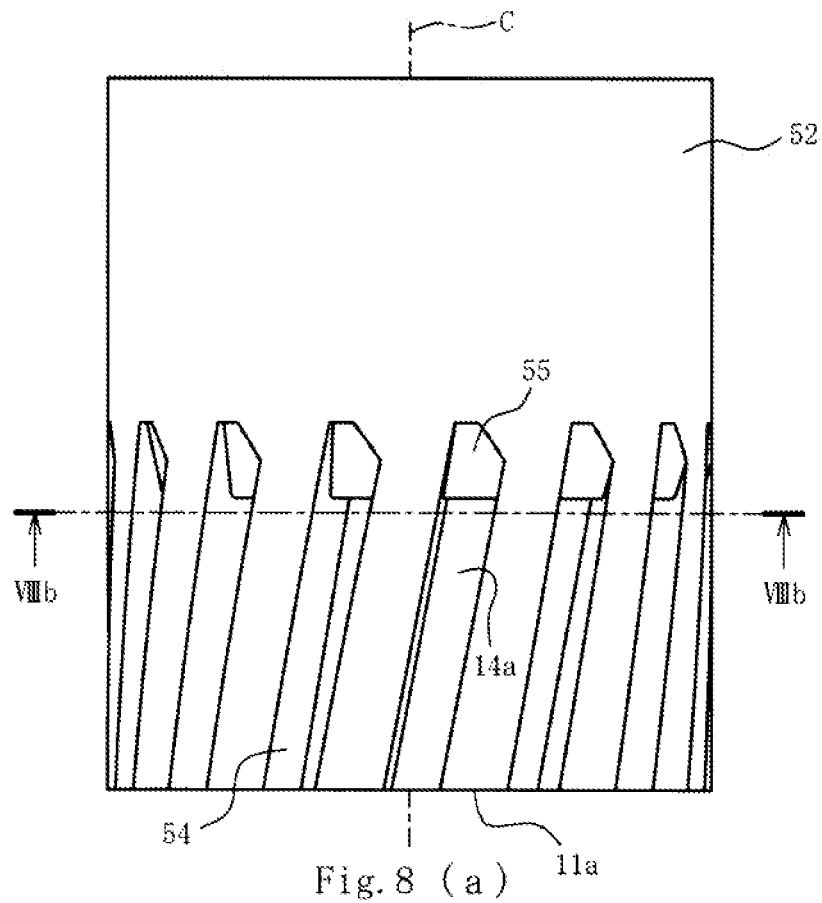
FIG. 8(a) is a front view of a body.
FIG. 8(b) is a cross-sectional view of the body taken along Line VIIIb-VIIIb in FIG. 8(a).
Figure 8:
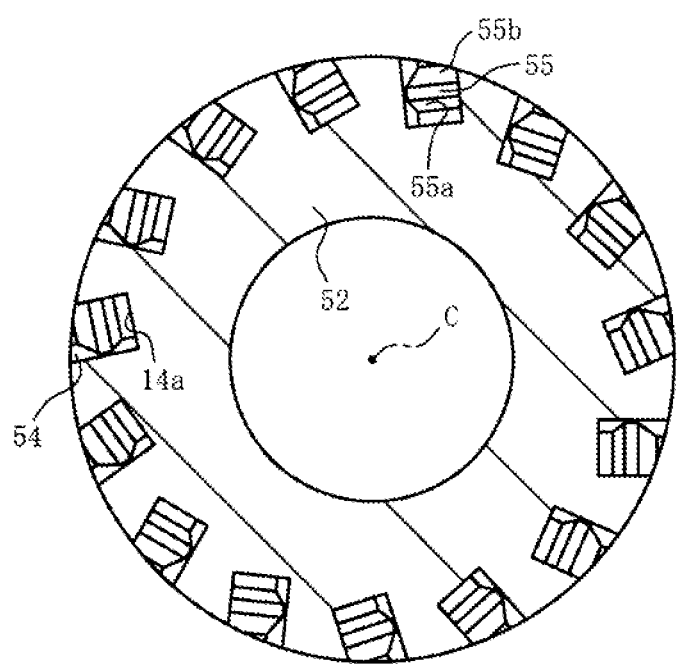
Figure 9:
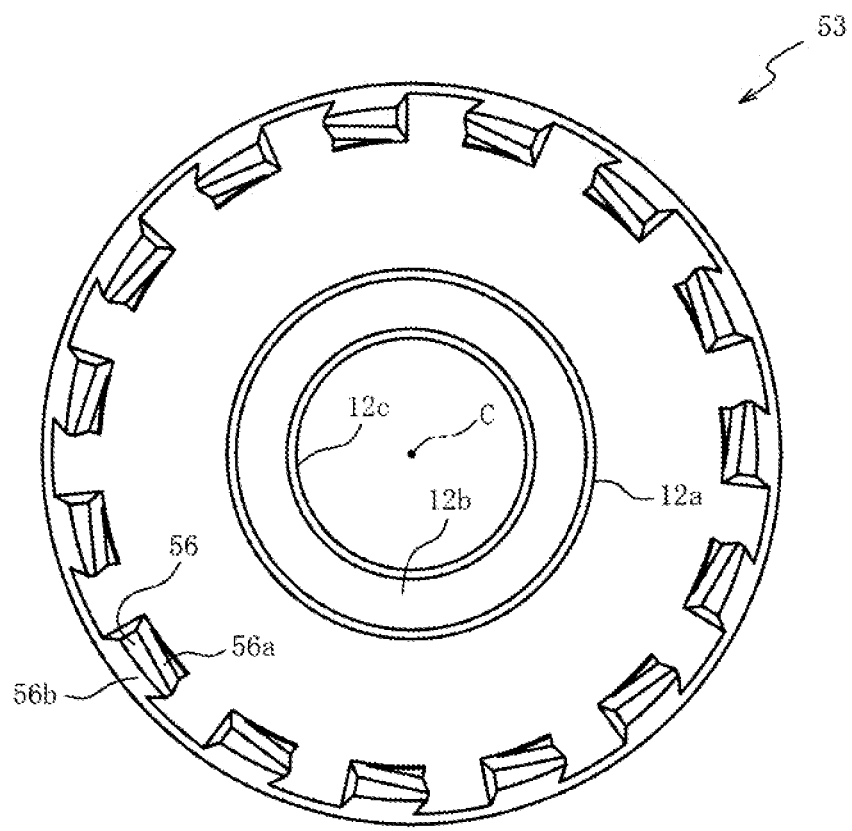
FIG. 9(a) is a top view of a lid.
FIG. 9(b) is a front view of the lid.
Figure 9:
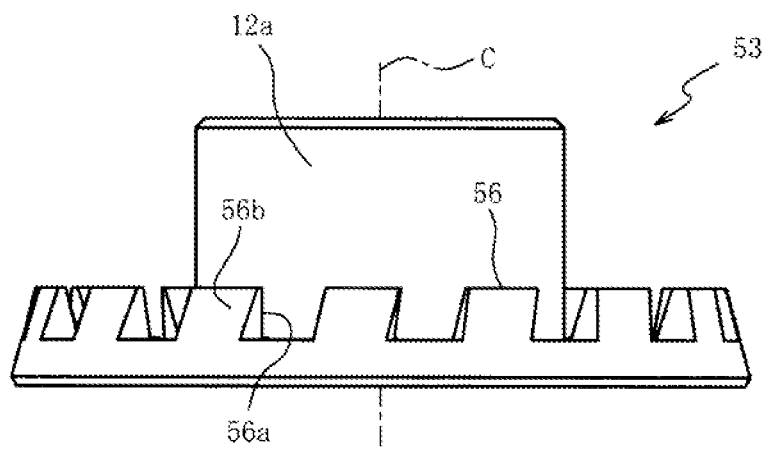
Figure 10:
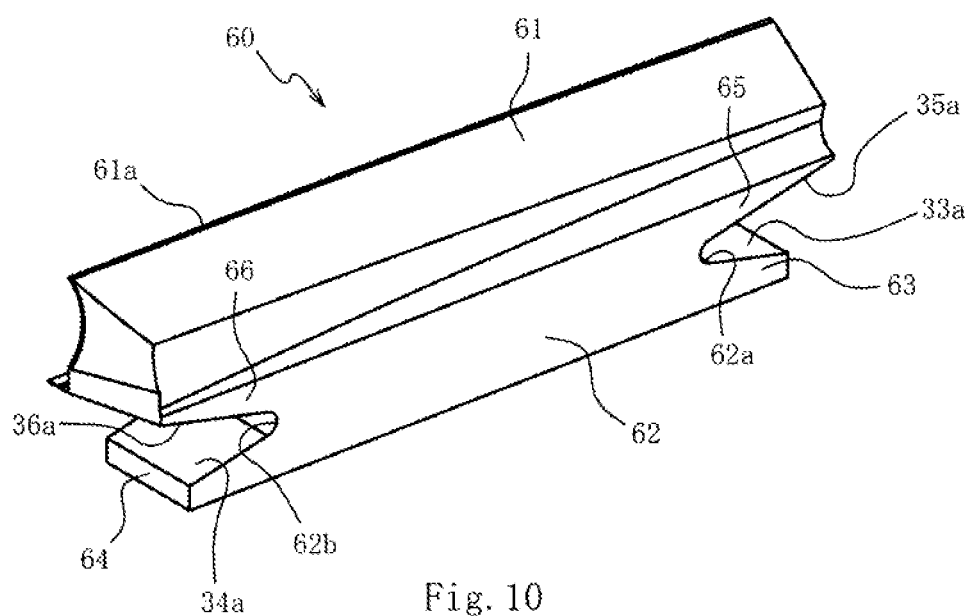
FIG. 10 is a perspective view of an insert.

FIG. 7 is a perspective view of the cutting tool 50 according to the third embodiment. FIG. 8(a) is a front view of a body 52. FIG. 8(b) is a cross-sectional view of the body 52 taken along Line VIIIb-VIIIb in FIG. 8(a). FIG. 9(a) is a top view of a lid 53. FIG. 9(b) is a front view of the lid 53. FIG. 10 is a perspective view of an insert 60.

As shown in FIG. 7, the cutting tool 50 is secured to a rotary drive device 2, such as an arbor, for use. The cutting tool 50 is made of cemented carbide, such as pressed and sintered tungsten carbide, high-speed tool steel, or the like. The cutting tool 50 is a shaft-like tool with a first end 3 on one side closer to the rotary drive device 2, and a second end 4 on the other side remote from the rotary drive device 2. To describe the third embodiment, the first end 3 of the cutting tool 50 is defined as an upper side, and the second end 4 as a lower side.

The cutting tool 50 includes a shaft-like insert holder 51 having the first end 3 and second end 4 at the opposite ends, and inserts 60 detachably held in the insert holder 51. The insert holder 51 includes a shaft-like body 52, a lid 53 attached to the lower side of the body 52, and a bolt 13 securing the lid 53 to the body 52.

The inserts 60 held in the insert holder 51 have cutting portions 61 sticking out from the outer circumferential surface of the insert holder 51. The cutting portions 61 are specifically designed for the end mill. With these configurations, the cutting tool 50 is used as an end mill that moves perpendicular to the axis C and cut workpieces with its outer circumferential surface. The cutting tool 50 used as an end mill is rotated clockwise about the axis C, as viewed from above, by the rotary drive device 2 to cut a workpiece.

As shown in FIGS. 8(a) and 8(b), the body 52 is a cylindrical member. The body 52 has a smooth and flat end face 11a on the lower side. The body 52 has a plurality of grooves 54 equally spaced on the outer circumferential surface.

The grooves 54 are formed to receive the inserts 60. The grooves 54 extend from the lower side to the upper right, in other words, the grooves 54 are formed helically (twisted) to the right. The grooves 54 are closed on the upper side, and are open on the lower side at the end face 11a of the body 52. The grooves 54 have smooth flat groove bottoms 14a on the side closer to the axis C.

When viewed from the lower side (FIG. 8(b)), the groove bottoms 14a of the grooves 54 are formed such that their leading sides in the clockwise direction are located farther from the axis C than their tailing sides. The grooves 54 have smooth flat side faces that extend perpendicular to the groove bottoms 14a and along the axis C.

The body 52 is provided with first projecting portions 55 that are placed a predetermined distance apart from the groove bottoms 14a of the grooves 54 and project into the grooves 54 from the upper side to the lower side of the grooves 54. The first projecting portions 55 provided to the grooves 54 are all identical in shape.

As viewed from the front (FIG. 8(a)), the tips of the first projecting portions 55 are formed in the direction perpendicular to the axis C. Each of the first projecting portions 55 has a first inner face 55a located closer to the groove bottom 14a, and a first outer face 55b located farther from the groove bottom 14a. The first inner face 55a is angled toward the groove bottom 14a as it extends to the upper side. The first outer face 55b is angled toward the groove bottom 14a as it extends to the lower side.

As viewed from the lower side (FIG. 8(b)), the first inner face 55a and first outer face 55b are formed such that their leading sides in the clockwise direction are located farther from the axis C than their tailing sides in the same manner as the groove bottoms 14a. Consequently, spaces, which extend uniformly in the circumferential direction and expand toward the tip of the first projecting portions 55, are created between the groove bottoms 14a and first projecting portions 55.

As shown in FIGS. 9(a) and 9(b), the lid 53 is a disk-like member having a cylindrical portion 12a at the center in the direction perpendicular to the axis. The lid 53 has second projecting portions 56 that are separately formed in the circumferential direction and project from the outer peripheral edge of the lid 53 toward the upper side. The second projecting portions 56 are located so as to align with the grooves 54 (see FIG. 8(a)).

When the lid 53 is attached to the body 52, the second projecting portions 56 are placed a predetermined distance apart from the groove bottoms 14a and project into the grooves 54. Therefore, the second projecting portions 56 extend to the upper right from the lower side to the upper side, in other words, the second projecting portions 56 are formed helically (twisted) to the right in the same manner as the grooves 54. The angle of inclination (helical/twist angle) of the second projecting portions 56 is equal to the angle of inclination (helical/twist angle) of the grooves 54.

As viewed from the front (FIG. 9(b)), the tips of the second projecting portions 56 are formed perpendicular to the axis C. Each of the second projecting portions 56 has a second inner face 56a located closer to the axis C, and a second outer face 56b located opposite to the axis C with respect to the second inner face 56a The second inner face 56a is angled toward the groove bottom 14a as it extends to the lower side. The second outer face 56b is angled toward the groove bottom 14a as it extends to the upper side.

When viewed from above (FIG. 9(a)), the second inner faces 56a are formed such that their tailing sides in the clockwise direction are located farther from the axis C than their leading sides. As described above, since the groove bottoms 14a are formed such that their leading sides in the clockwise direction are located farther from the axis C than their tailing sides as viewed from the bottom, spaces, which extend uniformly in the circumferential direction and expand toward the tip of the second projecting portions 56, are created between the second inner faces 56a and groove bottoms 14a.

On the other hand, the second outer faces 56b that do not make contact with the inserts 60 can be formed into desired shapes with a relatively high degree of freedom. Therefore, the second outer faces 56b are shaped so as to be uniformly apart from the axis C along the circumferential direction, in short, are designed to be readily formable.

As shown in FIG. 10, the insert 60 is an elongated member including a cutting portion 61 and a base portion 62 formed in one piece, and extending substantially upward and downward. The cutting portion 61 has a cutting edge 61a provided on a ridge at one end of the cutting portion 61 in the width direction. The cutting edge 61a digs into workpieces to cut the workpieces.

The base portion 62 is a part to be inserted into a groove 54. The width of the base portion 62 is substantially equal to that of the groove 54. All of the longitudinal faces of the base portion 62 are finished smooth and flat. Such a base portion 62 can be smoothly inserted into the groove 54 with the smooth and flat groove bottom 14a and side faces.

The base portion 62 has V-shaped cut-out portions 62a, 62b on the opposite ends in the longitudinal direction. The cut-out portions 62a, 62b are provided to avoid interference between the first projecting portion 55 and second projecting portion 56 when the base portion 62 is held in the insert holder 51 (when inserted into the groove 54). The base portion 62 has a first retaining portion 63 located farther from the cutting portion 61 than the cut-out portion 62a, and a first peripheral portion 65 located closer to the cutting portion 61 than the cut-out portion 62a. The base portion 62 has a second retaining portion 64 located farther from the cutting portion 61 than the cut-out portion 62b, and a second peripheral portion 66 located closer to the cutting portion 61 than the cut-out portion 62b.

The first retaining portion 63 is interposed between the groove bottom 14a and first projecting portion 55. The second retaining portion 64 is interposed between the groove bottom 14a and second projecting portion 56. The first peripheral portion 65 is situated in the groove 54 and on the outer circumferential side of the first projecting portion 55 without touching the first projecting portion 55. The second peripheral portion 66 is situated in the groove 54 and on the outer circumferential side of the second projecting portion 56 without touching the second projecting portion 56.

According to the cutting tool 50 of the above-described third embodiment, the cutting portions 61 of the inserts 60 can be arranged helically (twisted) to the right by inserting the inserts 60 into the grooves 54 extending to the upper right and inserting the second projecting portions 56 extending to the upper right into the grooves 54 to attach the lid 53 to the body 52. The cutting tool 50 configured as above can eject chips, which are created when the cutting edges 61a of the cutting portions 61 cut the workpiece, out from the upper side along the right-handed helices of the cutting portions 61.

Since the leading sides of the groove bottoms 14a of the grooves 54 in the clockwise direction are located farther from the axis C than the tailing sides as viewed from the bottom (second end 4 side), the inserts 60 to be inserted into the grooves 54 can be tilted forward in the counterclockwise direction with respect to the outer circumferential surface of the insert holder 51. The cutting tool 50 rotates in the counterclockwise direction to cut the workpiece as viewed from the bottom, and therefore the inserts 60 can be tilted forward in the rotational direction. This configuration can improve the ability of the insert holder 51 to support the load applied to the inserts 60 during the cutting operations. Consequently, the inserts 60 can cut the workpiece with improved stability.

In addition, as viewed from the lower side (second end 4 side), the first outer faces 55b are formed such that their leading sides in the clockwise direction are located farther from the axis C than their tailing sides in the same manner as the groove bottoms 14a. Therefore, the first outer faces 55b can receive the load applied to the inserts 60 during cutting operations. Consequently, the inserts 60 can cut the workpiece with further improved stability.

Although the present invention has been described with reference to the embodiments, it can be readily inferred that the invention is not limited to the embodiments, and various modifications can be made without departing from the scope of the invention. For instance, the shape of the bodies 11, 42, 52, lids 12, 43, 53, and inserts 30, 60 can be altered as required.

Although the cutting portions 31 of the inserts 30 are designed specifically for a reamer in the first and second embodiments, and also the cutting portions 61 of the inserts 60 are designed specifically for an end mill in the third embodiment, the present invention is not limited to these embodiments. It is of course possible to apply this invention to cutting portions specifically designed for a thread mill and a face mill.

Although the first projecting portions 17, 55 and second projecting portions 18, 45, 56 project into the grooves 14, 54 in the above-described embodiments, the present invention is not always limited to the embodiments. For instance, a first projecting portion and second projecting portion having an inner diameter greater than the outer diameter of the bodies 11, 42, 52 may be prepared and placed outside the grooves 14, 54 so as to press the inserts 30, 60 against the groove bottoms 14a.

Although the bodies 11, 42, 52 are formed with a single part in the above-described embodiments, the present invention is not always limited to the embodiments, and it is of course possible to form the body with two or more parts. For instance, a first cylindrical part and a second cylindrical part are prepared. The first cylindrical part has a plurality of grooves on the outer circumferential surface, and the grooves are open on the opposite end faces of the first cylindrical part. The second cylindrical part has a plurality of first projecting portions projecting from one end face thereof so as to align with the grooves. The body can be formed by securing the first cylindrical part and the second cylindrical part to each other while inserting the first projecting portions into the grooves.

The invention claimed is:

1. A cutting tool secured by a first end to a rotary drive device and rotated about an axis by the rotary drive device to cut a workpiece, comprising:

an insert holder having the first end and a second end at opposite ends; and a plurality of inserts detachably held in the insert holder, wherein the insert holder includes a body having a plurality of grooves formed on an outer circumferential surface, the grooves being closed on a first end side, and open on a second end side, and a lid to be attached to the second end side of the body, the inserts include base portions to be inserted into the grooves, and cutting portions that cut the workpiece, the cutting portions sticking out from the outer circumferential surface of the insert holder while the base portions are held in the grooves, wherein the inserts include the base portions and the cutting portions formed in one piece, the body includes first projecting portions that are spaced a predetermined distance apart from groove bottoms of the grooves and project from the first end side of the grooves toward the second end, the lid includes second projecting portions that, when the lid is attached to the body, are spaced a predetermined distance apart from the groove bottoms, and project toward the first end, the base portions include first retaining portions that are interposed between the groove bottoms and the first projecting portions, and second retaining portions that are interposed between the groove bottoms and the second projecting portions, the first projecting portions have first projecting faces on a side of the first retaining portions, the first projecting faces being angled toward the groove bottoms as they extend toward the first end, the second projecting portions have second projecting faces on a side of the second retaining portions, the second projecting faces being angled toward the groove bottoms as they extend toward the second end, the first retaining portions have first retaining faces making surface-contact with the first projecting faces, the second retaining portions have second retaining faces making surface-contact with the second projecting faces, the grooves are spaced apart from each other in a circumferential direction of the insert holder, the second projecting portions are disposed discontinuously in the circumferential direction of the insert holder, such that the second projecting portions are inserted into the grooves upon attachment of the lid to the second end side of the body, the lid has an outer diameter smaller than that of the body, the second projecting portions project into the grooves, ends of the cutting portions of the inserts in a direction parallel to the axis are coplanar with the second end of the insert holder, and the base portions of the inserts include peripheral portions located inside the grooves and outward from the second projecting portions in a direction perpendicular to the axis, the peripheral portions being contiguous with the cutting portions.

2. The cutting tool according to claim 1, wherein an angle formed by the first projecting faces and the groove bottoms is equal to an angle formed by the second projecting faces and the groove bottoms, a maximum distance from the groove bottoms to the second projecting faces is set to be greater than a minimum distance from the groove bottoms to the first projecting faces, and a maximum distance from the groove bottoms to the first projecting faces is set to be greater than a minimum distance from the groove bottoms to the second projecting faces.

3. The cutting tool according to claim 1, wherein the insert holder includes a bolt to secure the lid to the body, and the lid has a through hole at the center in the direction parallel to the axis, the through hole having a diameter smaller than that of a head of the bolt and receiving a shank of the bolt.

4. The cutting tool according to claim 3, wherein the body includes a first tubular portion on the second end side, the shank of the bolt being inserted into the first tubular portion, and a second tubular portion extending from the first tubular portion to the first end, and having an inner diameter greater than that of the first tubular portion, and the lid is secured to the body by coupling the bolt to the rotary drive device.

5. The cutting tool according to claim 1, wherein the second projecting portions are continuously formed in the circumferential direction of the insert holder, and the body has a plurality of recesses into which the second projecting portions are inserted, and the recesses being formed to connect the grooves.

6. An insert holder used in the cutting tool according to claim 1.

7. An insert used in the cutting tool according to claim 1.

* * * * *